UNITED STATES PATENT OFFICE.

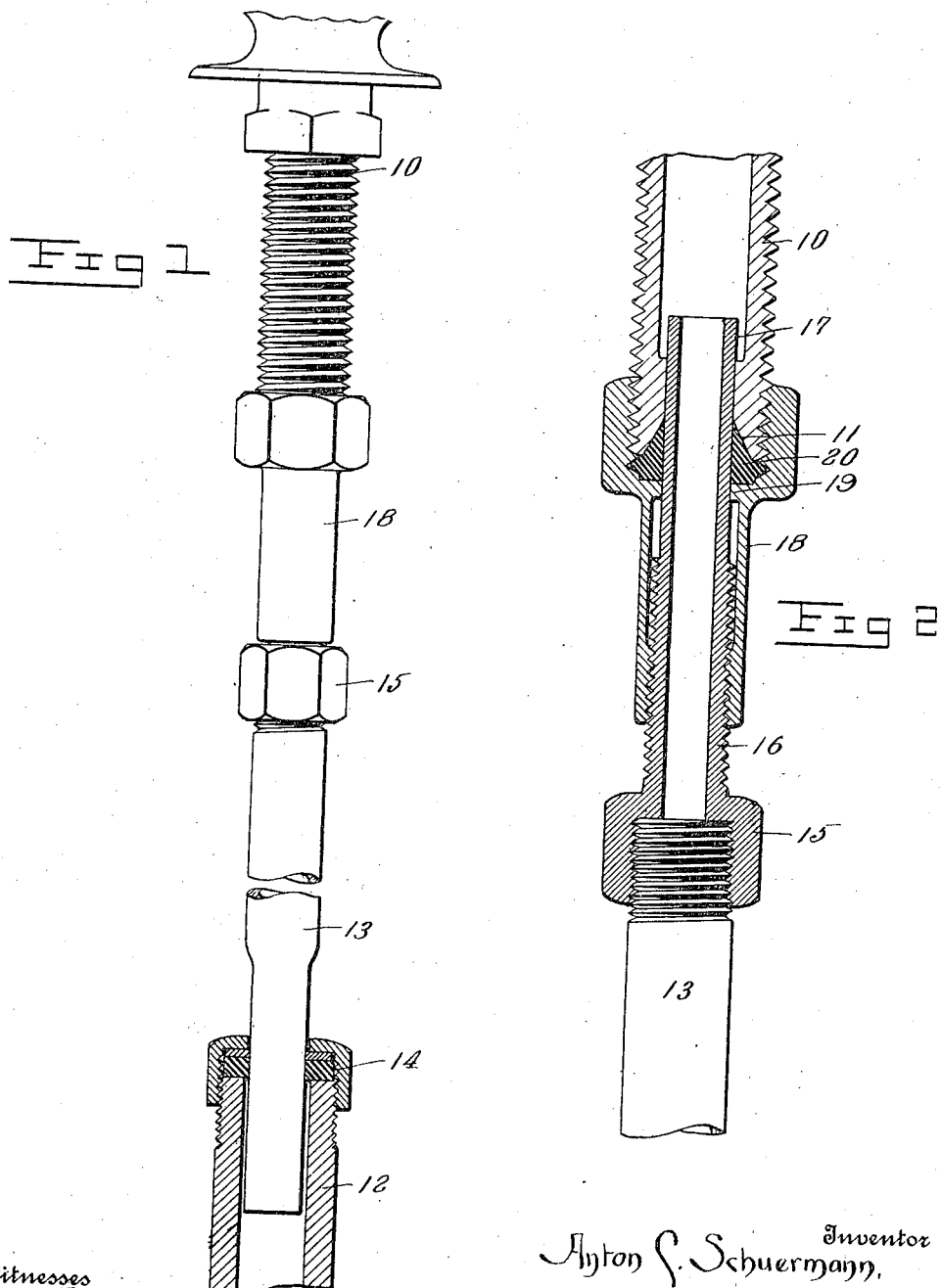

ANTON C. SCHUERMANN, OF DECATUR, ILLINOIS, ASSIGNOR TO H. MUELLER MANUFACTURING COMPANY, OF DECATUR, ILLINOIS, A CORPORATION OF ILLINOIS.

ADJUSTABLE SCREW-JOINT COUPLING FOR SUPPLY-PIPES.

1,043,364.  Specification of Letters Patent.  Patented Nov. 5, 1912.

Application filed March 22, 1911. Serial No. 616,276.

*To all whom it may concern:*

Be it known that I, ANTON C. SCHUERMANN, a citizen of the United States, residing at Decatur, in the county of Macon and State of Illinois, have invented new and useful Improvements in Adjustable Screw-Joint Couplings for Supply-Pipes, of which the following is a specification.

This invention relates to coupling pipes such as are employed in making connection between service pipes and the faucets of bath tubs, wash basins, and the like, this connection forming what is now generally known in the art as the supply pipe, and relates more particularly to the manner in which this pipe is coupled up to the part or parts to which it is connected.

In order to permit the use of coupling pipes or the supply pipe in standard sizes as to length and diameter, especially for open plumbing work, it is found advisable to provide adjustable connections between the supply pipe and either one or both of the parts to which it is connected, this being due to the fact that the distance between the service pipe and the faucet shank, spud, or tail-piece as the case may be, varies in installation. As the supply pipe, in open plumbing work, is visible throughout substantially its length, its appearance has more or less effect upon the beauty of the plumbing, and consequently the supply pipe should be, as far as possible, symmetrical in appearance with the remaining portions of the fixtures. In view of the fact that this symmetrical appearance must be provided in the face of conditions produced by the liquid pressure, several essentials are necessary.

One of the essentials required is that the coupling shall not be liable to blow-outs, and yet at the same time provide a structure in which the internal diameter of the supply should be of sufficient size for all practical purposes while the outer diameter is such as will not provide a bulky appearance. To meet these conditions, it has been proposed to employ a slip-joint connection with the end of the supply pipe telescoping into the fitting member, the supply pipe preferably having a flange against which the coupling nut may operate to retain the connection, a packing being employed in connection with this flange. This construction, owing to the liability of blow-outs under high liquid pressure, is not entirely satisfactory, one reason being that it is difficult to provide a proper manipulation of the packing so as to insure a non-leakage of liquid.

Another feature greatly desired in supply pipes, is to provide for variations in the distance between the service pipe and the faucet or lavatory member by the use of a standard length supply pipe, making the connections such as to eliminate all liability of blow-outs, one way of meeting this latter condition being to provide for a sufficient adjustment at the ends of the supply pipe to produce the proper exposed length of the pipe and yet provide a sufficient length of unexposed portion within the coupling as will make the latter practically blow-out proof. And a preferable form of device is to provide for connecting the supply and service pipes by a slip-joint, and providing for screw threaded adjustments in the connections at the opposite end of the supply pipe. To provide this arrangement I obtain the combined effect of the use of both screw threaded and slip-joint connections, obtaining the advantages of both and in addition eliminating all of the disadvantages of both. In obtaining this result I provide for compressing the packing onto a smooth face of the coupling.

Briefly stated I accomplish the results desired by providing two nut-sections adapted to engage, respectively, the ends of the pipes to be coupled, and equipping said nut-sections with relatively long extensions of reduced diameter and of male and female type, so that the coupling will be extensible through a considerable range. The extensions are threaded together and preferably the male extension will have a smooth end section to enter the bore of the pipe to which it is opposed, a suitable packing being compressed about this smooth section at the coupling point.

The object of my invention is, therefore, to provide a coupling pipe and connections capable of providing the essentials referred to, and the invention consists in the improved construction and combination of parts hereinafter fully described, illustrated in the accompanying drawings, and particularly pointed out in the appended claim.

In the drawings, in which similar reference characters indicate similar parts in each of the views,—Figure 1 is a view partly in elevation and partly in section of a preferred form of coupling pipe mounted in position. Fig. 2 is an enlarged longitudinal sectional view taken through the connection at the upper end of the pipe.

In the drawings, 10 designates a faucet shank exteriorly threaded and preferably having the interior of its end flared, as at 11. This shank is illustrative only for the purpose of describing the invention, it being understood that the part represented by the shank may be a portion of any type of fitting, such as the shank of a bath or basin cock, the tail-piece of a lavatory member, etc., the invention being applicable for use in connection with any of the well known types of fittings.

12 designates the service pipe, and 13 the coupling or supply pipe, the latter preferably being formed with a reduced lower end and connected to the service pipe by a slip-joint 14 of any preferred type. It is to be understood, however, that I do not limit the invention to this particular formation of the lower end of the pipe or the form of coupling, since it will be obvious that the supply pipe may have its lower end of equal diameter with the body of the pipe and that any suitable and preferred form of connection may be made between the supply and service pipes.

The principal feature of my invention is the manner in which the supply pipe is coupled to the shank 10, and a preferred form is shown in the drawings and will now be described.

15 designates a member preferably screw threaded to the upper end of the supply pipe 13 and forms an adjustable extension for said pipe, said member preferably being formed with a wrench-hold and being of reduced diameter externally in advance of the wrench-hold. The reduced portion of the member 15 has its external length divided into screw threaded and smooth portions, the screw threaded portion, indicated as 16, being adjacent to the wrench-hold, while the smooth portion, indicated as 17, extends from the screw threads to the advanced end of the member, the diameter of the smooth portion 17 being such as to permit it to extend loosely but approximately fit the interior of the shank 10 adjacent its inlet end.

18 designates a coupling member having its threads preferably on two planes complemental to the threads of the shank and the extension member 15, said coupling member also being formed with an inwardly extending flange 19 positioned intermediate the threaded portions, said flange having an opening of substantially equal diameter with the outer diameter of the smooth portion 17, the structure being such that said smooth portion will pass loosely through the opening in the flange 19.

As will be seen, the relative arrangement of parts just described is such as to provide for adjustment for variations in distance between the inlet end of the shank 10 and the outlet end of the service pipe 12. The threaded connection of the coupling member 18 and shank 10 is not primarily intended for the purpose of providing for adjustment, this connection acting to form the packing, this packing being provided by the preferable use of a soft metal gasket 20 which is compressed on to the smooth portion 17 by the action of the opposed faces provided by the flared end 11 and the flange 19, as shown in Fig. 2, the threading of the member 18 on to the shank causing the gasket to be compressed so as to form a liquid tight joint external of the smooth portion 17 at a point in advance of the flange 19.

The smooth portion 17, it will be observed, permits a telescoping or sliding movement of the extension in the gasket and does not positively lock the parts at this point, as would be the case if the extension 16 were threaded throughout and the packing forced into the threads.

An adjustment is provided between the extension member 15 and the supply pipe 13, as these two members are in threaded connection with one another, this latter adjustment acting as auxiliary to the main adjustment between the members 15 and 18.

As will be readily understood, the member 15 has a range of movement of considerable length within the coupling member 18 without withdrawing the smooth portion from the packing provided by the gasket, so that adjustments to increase or decrease the length of the supply pipe (represented by the pipe 13 and extension 15) may be had to meet service conditions and at the same time retain the advantages resulting from the use of the gasket packing in advance of the threaded connection between the members 15 and 18.

By this particular arrangement of parts the external threads of the supply pipe 13 need not be of as great a depth as those of the shank, thereby enabling the use of a supply pipe of medium wall thickness without restricting the liquid flow or providing a bulky appearance to the pipe. On the other hand, the threaded portion 16 of the member 15 is of sufficient wall thickness to permit of the formation of threads preferably of equal pitch with the threads of the shank without decreasing the strength of the member at that point. I preferably provide the threads of the member 18 of equal pitch to enable a preliminary positioning of the supply pipe before the gasket is compressed on to the smooth portion 17, such equal thread-pitch permitting the running of the member 18 on both threaded planes to compress the gasket but without affecting the initial adjustment of the supply pipe. But it is to be understood that this preference is not restrictive since the threads of the two planes of the coupling member 18 may be of unequal pitch, this alternative arrangement falling within the scope of the invention, the latter consisting in providing a screw threaded connection between the supply pipe and the shank in order to permit adjustments, and at the same time providing a packing in advance of the screw threaded connection so as to prevent liquid flow into the threads of the adjustable connection.

While I have herein disclosed a preferred form and modifications thereof, it is to be understood that changes and modifications therein required under the conditions of use may be employed and are contemplated by the invention herein so long as they fall within the spirit and scope of the invention as disclosed in the following claim.

Having thus described my invention what I claim as new is:—

In combination with a supply pipe having a threaded end, and an exteriorly threaded shank, an extension member threaded upon the supply pipe and having a reduced extension provided with threads extending from the inner end of the extension to the intermediate portion thereof and having a smooth surface extending from the end of the external threads to the outer end of the extension, a coupling member of two diameters the end of larger diameter engaging in threaded relation on the shank and having an internal flange opposed to the end of the shank, the end of smaller diameter having a smooth inner surface extending from the internal flange outwardly and having interior threads at its outer end, the reduced portion of the extension member extending through the small end of the coupling member and into the end of the shank, the threads of the smaller end engaging the threads of the reduced portion of the extension to adjustably and positively connect the members, and a gasket carried in the large end of the coupling member between the flange and end of the shank and adapted to bind against the smooth end of the reduced portion of the extension member.

In testimony whereof I have hereunto set my hand in presence of two subscribing witnesses.

ANTON C. SCHUERMANN.

Witnesses:
LEONARD F. McKIBBEN,
WILLIAM R. BIDDLE.